United States Patent
Xu et al.

(10) Patent No.: US 9,845,399 B2
(45) Date of Patent: Dec. 19, 2017

(54) SUBLIMATION INK FOR TRANSFER PRINTING

(71) Applicant: Nano and Advanced Materials Institute Limited, Hong Kong (HK)

(72) Inventors: Tao Xu, Hong Kong (HK); Li Fu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 0 days.

(21) Appl. No.: 15/140,507

(22) Filed: Apr. 28, 2016

(65) Prior Publication Data

US 2017/0313895 A1   Nov. 2, 2017

(51) Int. Cl.
  *C09D 11/102* (2014.01)
  *C09D 11/103* (2014.01)
  *C09D 11/107* (2014.01)
  *C08G 18/80* (2006.01)

(52) U.S. Cl.
  CPC ........ *C09D 11/102* (2013.01); *C08G 18/8067* (2013.01); *C09D 11/103* (2013.01); *C09D 11/107* (2013.01)

(58) Field of Classification Search
  CPC .................................................. C09D 11/102

USPC ................................................. 524/271, 272
See application file for complete search history.

(56) References Cited

U.S. PATENT DOCUMENTS

| | | |
|---|---|---|
| 6,105,502 A | 8/2000 | Wagner et al. |
| 7,001,649 B2 | 2/2006 | Wagner et al. |
| 7,654,660 B2 | 2/2010 | Hale et al. |
| 2009/0021568 A1* | 1/2009 | Xu ...................... C09B 67/0008 347/96 |

* cited by examiner

*Primary Examiner* — Terressa Boykin

(57) ABSTRACT

The present application provides a sublimation ink which is capable of being transferred to natural fiber fabrics, such as cotton and linen, in addition to synthetic fabrics, such as polyester, nylon, etc., and shows significantly improved color fastness. The sublimation ink may include a resin containing at least one active hydrogen, a crosslinking agent having at least two isocyanate (—NCO) groups, and one or more colorants. The sublimation ink may also include one or more carriers, binders, thickeners, and/or solvents. An image can be printed on a transfer medium (e.g. paper) at room temperature with the sublimation ink using conventional offset printer so that the sublimation ink remains inactive. The image can be subsequently transferred onto any desired fabrics under heat and pressure, in which the sublimation ink is activated and bonds the colorant to the fabrics with excellent color effect.

19 Claims, No Drawings

SUBLIMATION INK FOR TRANSFER PRINTING

FIELD OF THE PATENT APPLICATION

The present patent application relates to a sublimation ink for transfer printing on fabrics.

BACKGROUND

Transfer printing is a versatile technique that is used to print words, images and designs onto textile materials and other objects. Two main types of inks for transfer printing are sublimation inks and plastisol inks. For sublimation inks, the dyes are sublimated at ~190-210° C. and adhere onto the fabrics. However, sublimation inks work only with polyester fabrics and do not have satisfying color fastness when printed on cotton fabrics. Typical plastisol inks are vinyl resins dispersed in plasticizers and transferred to fabrics through heating. Plastisol inks can be printed onto various textile materials, but they do not provide the required soft hand-feel.

Therefore, there is a considerable need to provide improved inks for transfer printing process.

SUMMARY

The present application provides a sublimation ink for transfer printing, which may include a resin containing at least one active hydrogen, a crosslinking agent having at least two isocyanate (—NCO) groups, and one or more colorants. The resin containing at least one active hydrogen may include at least one resin selected from the group consisting of acrylic acid resins, alkyd resins, thermoplastic polyurethane resins, and ethylene vinyl acetate copolymers. In some embodiments, the sublimation ink may include about 0-10 wt. % acrylic acid resins, about 0-2.5 wt. % alkyd resins, about 0-5 wt. % aldehyde and ketone resins, about 2-10 wt. % thermoplastic polyurethane resins, and about 0-1 wt. % ethylene vinyl acetate copolymers. The resin containing at least one active hydrogen may be in a total amount of about 2.5-10 wt. % of the ink.

The crosslinking agent having at least two isocyanate (—NCO) groups may include at least one crosslinking agent selected from the group consisting of urethane pre-polymers and isocyanates having at least two —NCO groups. The crosslinking agent may be present in an amount of about 2.5 to about 10 wt. % of the sublimation ink.

The urethane pre-polymers may have an average molecular weight ranging from about 1000 to about 6000. The urethane pre-polymers may be obtained from a reaction of isocyanates with at least one hydroxy-functional material selected from the group consisting of long-chained diols, polyether diols, polyester diols, long-chained polyols and polyester polyols. The hydroxy-functional material may have an average molecular weight (Mn) between about 500 and about 6000, and preferably between about 2000 and about 4000. The isocyanates may include at least one isocyanate selected from the group consisting of monoisocyanates, diisocyanates, and polyisocyanates.

The resin and the crosslinking agent may be present in a —NCO/—OH mole ratio ranging from about 1 to about 2, and preferably of about 1.5.

The sublimation ink may further include trimethylolpropane.

The colorants may include at least one colorant selected from the group consisting of disperse dyes and pigments. The colorants may be in the range of about 25 to about 30 wt. %, and preferably at about 27 wt. %.

The sublimation ink may further include one or more carriers. The carriers may include at least one carrier selected from the group consisting of gum rosin, triglcerides, and beeswax. In some embodiments, the carriers may include 30 wt. % gum rosin, 39 wt. % triglcerides and 4 wt. % beeswax.

The isocyanate groups on the crosslinking agent may be blocked by reacting with a protecting unit having at least one hydroxyl group.

An image printed by the sublimation ink may be capable of being transferred from a transfer medium to natural fiber fabrics or synthetic fabrics at around 190° C. to 210° C. The fabrics may be selected from the group consisting of cotton, linen, polyester and nylon.

DETAILED DESCRIPTION

Reference will now be made in detail to preferred embodiments of sublimation inks for transfer printing disclosed in the present application, examples of which are also provided in the following description. Exemplary embodiments of the sublimation inks disclosed in the present application are described in detail, although it will be apparent to those skilled in the relevant art that some features that are not particularly important to an understanding of the present application may not be shown for the sake of clarity.

Before the present application is described in further detail, it is to be understood that the terminology used herein is for the purpose of describing particular embodiments only, and is not intended to be limiting, since the scope of the present application will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the application. The upper and lower limits of these smaller ranges may independently be included in the smaller ranges is also encompassed within the application, subject to any specifically excluded limit in the stated range. Where the stated range includes one or both of the limits, ranges excluding either or both of those included limits are also included in the application.

Unless defined otherwise, all technical and scientific terms used herein have the same meaning as commonly understood by one of ordinary skill in the art to which this application belongs. Although any methods and materials similar or equivalent to those described herein can also be used in the practice or testing of the present application, a limited number of the exemplary methods and materials are described herein.

It must be noted that as used herein and in the appended claims, the singular forms "a", "an", and "the" include plural referents unless the context clearly dictates otherwise.

The present application provides a sublimation ink which is capable of being transferred to natural fiber fabrics, such as cotton and linen, in addition to synthetic fabrics, such as polyester, nylon, etc., and shows significantly improved color fastness. An image can be printed on a transfer medium (e.g. paper) at room temperature with the sublimation ink of the present application using conventional offset printer so that the sublimation ink remains inactive. The image can be subsequently transferred onto any desired fabrics under heat and pressure, in which the sublimation ink is activated and bonds the colorant to the fabrics with excellent color effect. Furthermore, the color fastness to washing can be greatly improved.

The sublimation ink of the present application may include a resin containing at least one active hydrogen, a crosslinking agent having at least two isocyanate (—NCO) groups, and one or more colorants. The sublimation ink may include trimethylolpropane as an additive. The sublimation ink may also include one or more carriers. Optionally, the sublimation ink may include any suitable binders, thickeners, and/or solvents.

The resin containing at least one active hydrogen may include acrylic acid resins (e.g. A-76 from Liaoning Sanhuan Resins Co., Ltd.), alkyd resins (e.g. JC115 from Dery Chemical), aldehyde and ketone resins (e.g. AK120 from SMA), thermoplastic polyurethane resins (e.g. 6880 from CG, China), ethylene vinyl acetate copolymers (e.g. Escorene™ UL05540), or any combinations thereof. The sublimation ink of the present application may include a total amount of about 2.5-10 wt. % of the resins containing at least one active hydrogen.

The suitable amount ranges of resins in the ink are: acrylic acid resins (about 0-10 wt. %), alkyd resins (about 0-2.5 wt. %), aldehyde and ketone resins (about 0-5 wt. %), thermoplastic polyurethane resins (about 2-10 wt. %), and ethylene vinyl acetate copolymers (about 0-1 wt. %).

The crosslinking agent having at least two isocyanate (—NCO) groups may include urethane (PU) pre-polymers, or isocyanates having at least two —NCO groups. The crosslinking agent may be present in an amount of about 2.5 to about 10 wt. % of the sublimation ink. The limitation of the average molecular weight of the urethane pre-polymers is from about 1000 to about 6000. The urethane pre-polymers may be obtained from reaction of a hydroxy-functional material with isocyanates. The hydroxy-functional material may include long-chained diols, polyether diols, polyester diols, long-chained polyols and polyester polyols. The isocyanates may include monoisocyanates, diisocyanates, polyisocyanates, or any combinations thereof. The hydroxy-functional material used to prepare the urethane pre-polymers typically has an average molecular weight (Mn) between about 500 and about 6000, and preferably between about 2000 and about 4000.

The resin and the crosslinking agent may be present in a stoichiometric balance of the active hydrogens and the isocyanate (—NCO) groups. In some embodiments, the resin and the crosslinking agent may be present in a —NCO/—OH mole ratio ranging from about 1 to about 2. In some preferred embodiments, the resin and the crosslinking agent may be present in a —NCO/—OH mole ratio of about 1.5.

Suitable colorants in the sublimation ink may include any commercially available disperse dyes and pigments which sublimes at ~190-210° C. Suitable amount of the colorants may be in the range of about 25 to about 30 wt. %, and preferably at about 27 wt. %.

Suitable carriers in the sublimation ink may include gum rosin, triglcerides, beeswax, or any combinations thereof. In some embodiments, the carrier in the sublimation ink may be a mixture of gum rosin, triglcerides and beeswax. In some embodiments, the sublimation ink may include 30 wt. % gum rosin, 39 wt. % triglcerides and 4 wt. % beeswax.

The sublimation ink may include about 1 to about 5 wt. % of trimethylolpropane.

To prevent premature activation of the sublimation ink before an image is transferred to the desired fabric, the isocyanate groups on the crosslinking agent are blocked by protecting units. Blocking of the isocyanate groups may be carried out by reacting with a protecting unit having a hydroxyl group in a stoichiometric balance of isocyanate groups to hydroxyl groups, depending on the functionality of the crosslinking agent. The protecting unit should be slightly in excess to ensure complete blocking of the isocyanate groups. For example, the mole ratio of equivalents of isocyanate groups to the equivalents of hydroxyl groups may range from about 1:1.1 to about 1:1.3. Preferably, the mole ratio of equivalents of isocyanate groups to the equivalents of hydroxyl groups may be about 1:1.2.

Preferably, the above blocking process may be performed in the presence of a suitable catalyst, such as stannous octoate catalyst, at about 60-80° C. The duration of the blocking process can be around 2-8 hours, preferably about 4 hours. Suitable protecting units (blocking agent) may include but not limited to unsubstituted or alkyl-substituted phenols and ketoxime. In some embodiments of the present application, the protecting unit may include phenol, caprolactam, methyl ethyl ketoxime or any combinations thereof. Suitable solvents for blocking the crosslinking agent may include acetone, dimethylformamide (DMF), toluene, ethyl acetate and any mixtures thereof. In some embodiments of the present application, the solvent for blocking the crosslinking agent is a mixture of DMF and acetone in a weight ratio of about 10:1.

The sublimation ink of the present application may be prepared by thoroughly mixing the resin, blocked crosslinking agent, colorants, carriers and any other suitable additives to a uniform paste.

An image can be printed with the sublimation ink of the present application on a transfer medium using any conventional offset printer. The transfer medium may include any commercially available release parchment, e.g. HANSOL SW-HSTP Heat Transfer Paper. By adding suitable solvents to the sublimation ink of the present application to lower the viscosity to a suitable level, the ink can also be used in digital printers, which may be an ink jet printer or an electrographic device, such as a laser printer or photocopier.

The image printed with the sublimation ink can be transferred from the transfer medium to natural fiber fabrics, such as cotton and linen, in addition to synthetic fabrics, such as polyester, nylon, etc., by heating machines. When the sublimation ink is heated at ~190-210° C., blocked isocyanate groups of the crosslinking agent are unblocked. In-situ polymerization between the free isocyanate groups of the crosslinking agent and the resin occurs. The colorant of the sublimation ink is then bonded to the fabrics.

The sublimation ink of the present application can be used in any suitable transfer printing method. The suitable transfer printing method encompasses any image forming method suitable for use with the sublimation ink. Adjustment of viscosity of the sublimation ink through addition of suitable solvents would allow the ink to be used in traditional printing, ink jet printing, xerographic imaging, draw down imaging.

Example 1

Preparation of blocked urethane pre-polymer crosslinking agent 1.62 g phenol and 0.03 g stannous octoate were dissolved in around 2 g DMF. 20 g Tolylene 2,4-diisocyanate terminated poly(propylene glycol) with average Mn ~2,300 (commercially available from Sigma-Aldrich®) (PPG-NCO) was dissolved in about 100 ml acetone. The solution was deoxygenized by bubbling with nitrogen and stirred by magnetic stirrer. Then, the PPG-NCO solution was added with the DMF solution and heated at about 65° C. under nitrogen for 4 hours to initiate blocking reaction. The blocking of PU pre-polymer was completed when all free —NCO group was used up, which was determined by titration method of acetone-butylamine. Below is the equation of this blocking reaction.

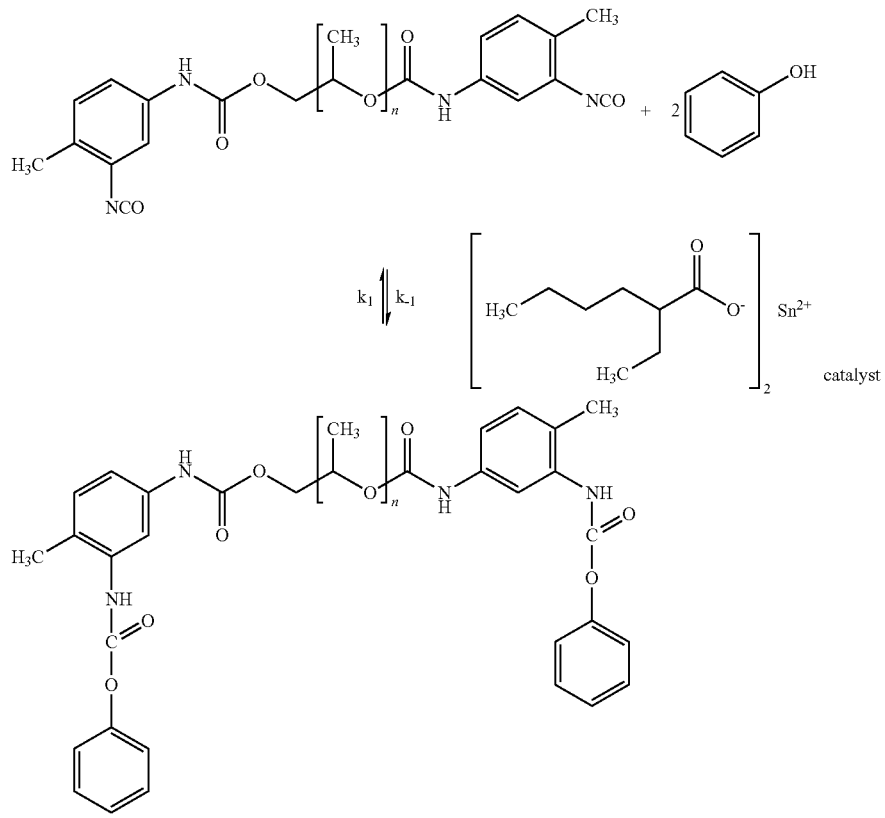

Example 2

A base sublimation ink was made up with 30 wt. % gum rosin, 39 wt. % triglcerides, 4 wt. % beeswax and 27% wt. disperse dyes.

To 2 g of the base sublimation ink, the following components were added and mixed to form a uniform paste:

| Component | Amount |
| --- | --- |
| Blocked PU pre-polymer from Example 1 | 0.2 g |
| AK120 from SMA (20 wt. % aldehyde and ketone resin in ethyl acetate) | 0.75 g |
| JC115 from Dery Chemical (alkyd resin) | 0.05 g |
| Escorene ™ UL05540 (20 wt. % ethylene vinyl acetate copolymer in ethyl acetate) | 0.05 g |
| Trimethylolpropane | 0.05 g |

Example 3

To 2 g of the base sublimation ink, the following components were added and mixed to form a uniform paste:

| Component | Amount |
| --- | --- |
| Blocked PU pre-polymer from Example 1 | 0.2 g |
| A-76 from Liaoning Sanhuan Resins Co., Ltd. (20 wt. % acrylic acid resin in toluene) | 0.75 g |
| Escorene ™ UL05540 (20 wt. % ethylene vinyl acetate copolymer in ethyl acetate) | 0.05 g |
| Trimethylolpropane | 0.05 g |

Example 4

To 2 g of the base sublimation ink, the following components were added and mixed to form a uniform paste:

| Component | Amount |
| --- | --- |
| KL120 from Jiangsu Cale New Materials Co., Ltd. (blocked isocyanate crosslinking agent) | 0.2 g |
| AK120 from SMA (20 wt. % aldehyde and ketone resin in ethyl acetate) | 0.5 g |
| JC115 from Dery Chemical (alkyd resin) | 0.1 g |
| Escorene ™ UL05540 (20 wt. % ethylene vinyl acetate copolymer in ethyl acetate) | 0.05 g |
| 6880 from CG, China (20 wt. % thermoplastic polyurethane resin in methyl ethyl ketone (MEK)) | 1 g |

Example 5

To 2 g of the base sublimation ink, the following components were added and mixed to form a uniform paste:

| Component | Amount |
| --- | --- |
| KL120 from Jiangsu Cale New Materials Co., Ltd. (blocked isocyanate crosslinking agent) | 0.2 g |
| AK120 from SMA (20 wt. % aldehyde and ketone resin in ethyl acetate) | 0.5 g |
| E-44 from Hongming Co. Ltd. (epoxy modified Acrylic acid resin) | 0.15 g |
| Escorene™ UL05540 (20 wt. % ethylene vinyl acetate copolymer in ethyl acetate) | 0.05 g |
| 6880 from CG, China (20 wt. % Thermoplastic polyurethane resin in methyl ethyl ketone (MEK)) | 1 g |

Example 6

The base sublimation ink was used as a control for comparison of the color fastness of the sublimation inks of the present application. Images using the sublimation inks from Examples 2-5 and the control sublimation ink were printed onto HANSOL SW-HSTP Heat Transfer Paper respectively by an offset printing machine (Nuobang NB600 Color Mixing Simulation Machine). After the images were dried at ambient temperature, the images were transferred to cotton fabrics by hot pressing machine at 205° C. for 60 seconds.

Subsequently, the cotton fabrics were mechanically washed at 105° F. for 45 min. in 0.15% 1993 AATCC Standard Reference detergent 'WOB' solution with 50 steel balls and the changes in shade of images were graded according to standard test No. 2A of AATCC 61-2013. The results are summarized in the table below.

| Sublimation ink | Change in shade for cotton after standard washing |
| --- | --- |
| Control | 1.0 |
| Example 2 | 3.0 |
| Example 3 | 3.5 |
| Example 4 | 3.5 |
| Example 5 | 4.0 |

From the above results, the color fastness of the image was significantly improved when using the sublimation inks of the present application. In textile industry, a minimum of level 3 color fastness is required. The images printed with the sublimation inks of the present application meet or even exceed the industry requirement.

Thus, sublimation inks for transfer printing have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A sublimation ink for transfer printing, comprising: a resin containing at least one active hydrogen, a crosslinking agent having two or more blocked isocyanate (—NCO) groups, and one or more colorants, wherein the crosslinking agent is having an average molecular weight of at least 2000, and wherein the two or more blocked isocyanate (—NCO) groups of the crosslinking agent are unblocked and the sublimation ink is capable of being transferred from a transfer medium to natural fiber fabrics or synthetic fabrics at around 190° C. to 210° C.

2. The sublimation ink of claim 1, wherein the resin containing at least one active hydrogen comprises at least one resin selected from the group consisting of acrylic acid resins, alkyd resins, thermoplastic polyurethane resins, and ethylene vinyl acetate copolymers.

3. The sublimation ink of claim 2, wherein the sublimation ink comprises about 0-10 wt. % acrylic acid resins, about 0-2.5 wt. % alkyd resins, about 0-5 wt. % aldehyde and ketone resins, about 2-10 wt. % thermoplastic polyurethane resins, and about 0-1 wt. % ethylene vinyl acetate copolymers.

4. The sublimation ink of claim 1, wherein the resin containing at least one active hydrogen is in a total amount of about 2.5-10 wt. % of the ink.

5. The sublimation ink of claim 1, wherein the crosslinking agent having two or more blocked isocyanate (—NCO) groups comprises at least one crosslinking agent selected from the group consisting of urethane pre-polymers and isocyanates having at least two —NCO groups.

6. The sublimation ink of claim 5, wherein the crosslinking agent is present in an amount of about 2.5 to about 10 wt. % of the sublimation ink.

7. The sublimation ink of claim 5, wherein the urethane pre-polymers are obtained from a reaction of isocyanates with at least one hydroxy-functional material selected from the group consisting of long-chained diols, polyether diols, polyester diols, long-chained polyols and polyester polyols.

8. The sublimation ink of claim 7, wherein the hydroxy-functional material has an average molecular weight (Mn) between about 500 and about 6000, and preferably between about 2000 and about 4000.

9. The sublimation ink of claim 1, wherein the resin and the crosslinking agent are present in a —NCO/—OH mole ratio ranging from about 1 to about 2, and preferably of about 1.5.

10. The sublimation ink of claim 1, further comprising trimethylolpropane.

11. The sublimation ink of claim 1, wherein the colorants comprise at least one colorant selected from the group consisting of disperse dyes and pigments.

12. The sublimation ink of claim 11, wherein the colorants is in the range of about 25 to about 30 wt. %, and preferably at about 27 wt. %.

13. The sublimation ink of claim 1, further comprising one or more carriers.

14. The sublimation ink of claim 13, wherein the carriers comprise at least one carrier selected from the group consisting of gum rosin, triglycerides, and beeswax.

15. The sublimation ink of claim 14, wherein the carriers comprise 30 wt. % gum rosin, 39 wt. % triglycerides and 4 wt. % beeswax.

16. The sublimation ink of claim 1, wherein the isocyanate groups on the crosslinking agent are blocked by reacting with a protecting unit having at least one hydroxyl group.

17. The sublimation ink of claim 1, wherein the fabrics are selected from the group consisting of cotton, linen, polyester and nylon.

18. The sublimation ink of claim 16, wherein the isocyanate groups on the crosslinking agent are blocked in the presence of a suitable catalyst including at least stannous octoate catalyst, and wherein the duration of the blocking process is in the range of 2-8 hours.

19. The sublimation ink of claim 16, wherein a mole ratio of equivalents of the isocyanate groups to equivalents of the hydroxyl groups ranges from about 1:1.1 to about 1:1.3.

* * * * *